(12) United States Patent
VanBlon et al.

(10) Patent No.: US 11,212,280 B1
(45) Date of Patent: Dec. 28, 2021

(54) AUTHENTICATING USE OF AN APPLICATION

(71) Applicant: LENOVO (Singapore) PTE. LTD., New Tech Park (SG)

(72) Inventors: Russell Speight VanBlon, Raleigh, NC (US); Nathan J. Peterson, Oxford, NC (US); John Carl Mese, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 209 days.

(21) Appl. No.: 16/529,997

(22) Filed: Aug. 2, 2019

(51) Int. Cl.
  *H04L 29/06* (2006.01)
(52) U.S. Cl.
  CPC ........ *H04L 63/0876* (2013.01); *H04L 63/107* (2013.01)
(58) Field of Classification Search
  CPC ... H04L 63/0876; H04L 63/107; H04L 63/18; H04L 63/08; H04L 63/0853; H04L 63/10
  See application file for complete search history.

(56) References Cited

U.S. PATENT DOCUMENTS

| | | | | |
|---|---|---|---|---|
| 8,407,768 B1* | 3/2013 | Hayter | ............... | H04L 63/0853 726/5 |
| 9,355,231 B2* | 5/2016 | Disraeli | .................. | H04W 4/02 |
| 9,893,940 B1* | 2/2018 | Chawla | ............... | H04L 41/0816 |
| 10,645,068 B2* | 5/2020 | Bonnell | .................. | H04L 63/08 |
| 2014/0157392 A1* | 6/2014 | Smith | .................... | H04L 63/10 726/9 |
| 2014/0282877 A1* | 9/2014 | Mahaffey | ............. | H04W 12/08 726/3 |
| 2016/0065367 A1* | 3/2016 | Oshida | ............... | H04W 12/069 370/329 |
| 2017/0149570 A1* | 5/2017 | Counterman | ......... | H04L 63/102 |
| 2017/0289172 A1* | 10/2017 | Turakhia | ................ | H04L 63/08 |

* cited by examiner

*Primary Examiner* — Richard A McCoy
(74) *Attorney, Agent, or Firm* — Kunzler Bean & Adamson

(57) ABSTRACT

Apparatuses, methods, systems, and program products are disclosed for authenticating use of an application. An apparatus includes a processor and a memory that stores code executable by the processor. The memory stores code executable by the processor to receive a location identifier for a first device that provides an application that requires authentication for use. The memory stores code executable by the processor to receive a location identifier for a second device that is used to authenticate a user who intends to use the application that the first device provides. The memory stores code executable by the processor to provide access to the application that the first device provides in response to the location identifier for the first device matching the location identifier for the second device.

16 Claims, 6 Drawing Sheets

AUTHENTICATING USE OF AN APPLICATION

FIELD

The subject matter disclosed herein relates to computer applications, and more particularly relates to authenticating use of an application prior to using the application.

BACKGROUND

Configuring applications that execute on Internet-of-Things devices typically requires the user to login on a different device to the user account associated with an application and enter a code. This can be inconvenient, time consuming, and error prone if the incorrect code is input, if network connectivity is lost, etc.

BRIEF SUMMARY

An apparatus for authenticating use of an application is disclosed. The apparatus, in one embodiment, includes a processor and a memory that stores code executable by the processor. In certain embodiments, the memory stores code executable by the processor to receive a location identifier for a first device that provides an application that requires authentication for use. In further embodiments, the memory stores code executable by the processor to receive a location identifier for a second device that is used to authenticate a user who intends to use the application that the first device provides. In some embodiments, the memory stores code executable by the processor to provide access to the application that the first device provides in response to the location identifier for the first device matching the location identifier for the second device.

A method for authenticating use of an application includes, in one embodiment, receiving, by a processor, a location identifier for a first device that provides an application that requires authentication for use. The method, in some embodiments, includes receiving a location identifier for a second device that is used to authenticate a user who intends to use the application that the first device provides. The method, in various embodiments, includes providing access to the application that the first device provides in response to the location identifier for the first device matching the location identifier for the second device.

A program product for authenticating use of an application, in one embodiment, includes a computer readable storage medium that stores code executable by a processor. In some embodiments, the executable code includes code to perform receiving a location identifier for a first device that provides an application that requires authentication for use. The executable code, in certain embodiments, includes code to perform receiving a location identifier for a second device that is used to authenticate a user who intends to use the application that the first device provides. The executable code, in certain embodiments, includes code to perform providing access to the application that the first device provides in response to the location identifier for the first device matching the location identifier for the second device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
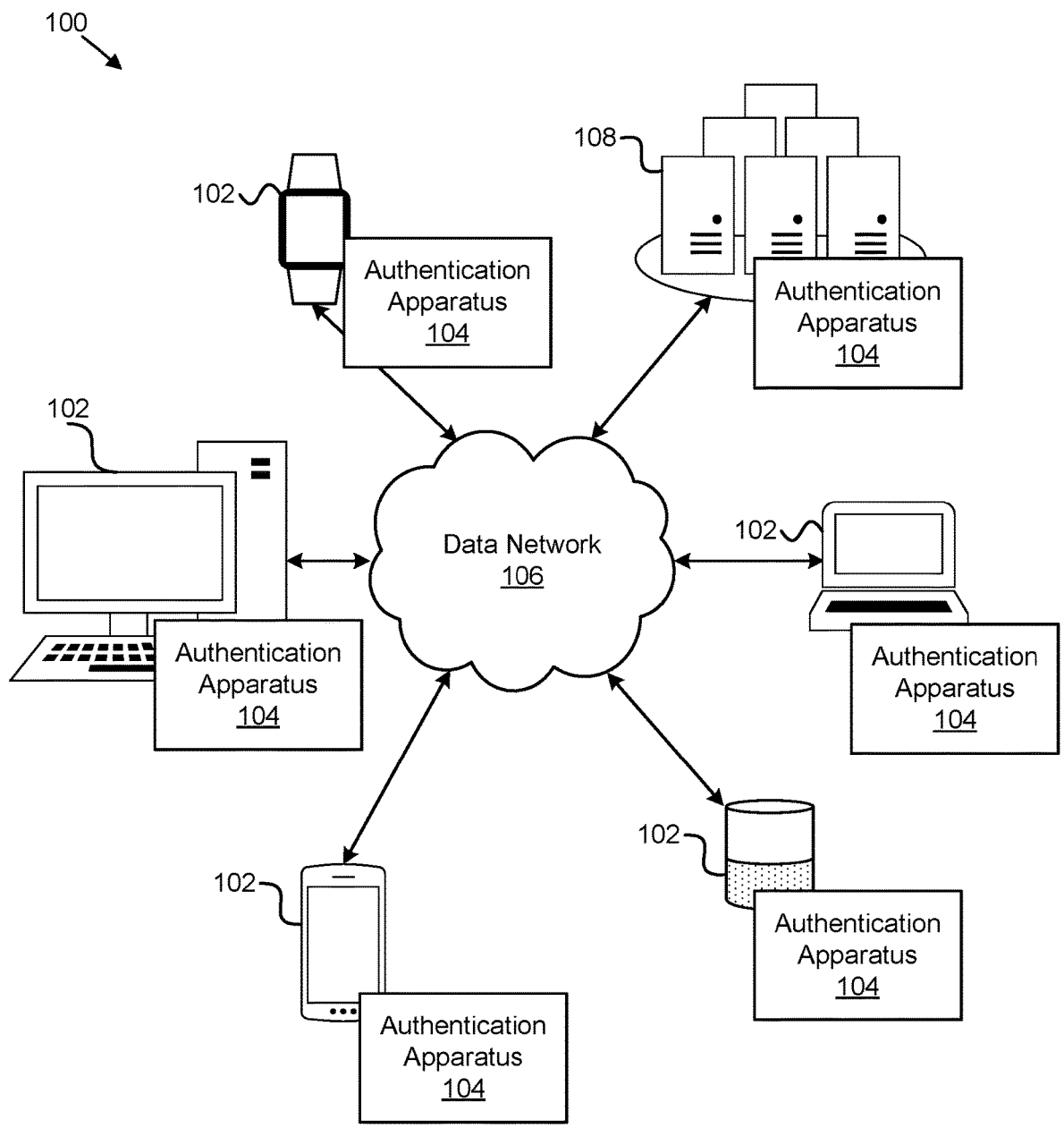
FIG. 1 is a schematic block diagram illustrating one embodiment of a system for authenticating use of an application.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus for authenticating use of an application is disclosed. The apparatus, in one embodiment, includes a processor and a memory that stores code executable by the processor. In certain embodiments, the memory stores code executable by the processor to receive a location identifier for a first device that provides an application that requires authentication for use. In further embodiments, the memory stores code executable by the processor to receive a location identifier for a second device that is used to authenticate a user who intends to use the application that the first device provides. In some embodiments, the memory stores code executable by the processor to provide access to the application that the first device provides in response to the location identifier for the first device matching the location identifier for the second device.

In one embodiment, the location identifier for the first device and the location identifier for the second device comprise public IP addresses. In some embodiments, the location identifier for the first device is received from the first device in response to the application failing to authorize the user to use the application and the location identifier for the second device is received from the second device in response to the user visiting an online gateway associated with the application. In one embodiment, the online gateway is selected from the group consisting of a web page, a web service, and a mobile application.

In certain embodiments, in response to receiving a plurality of location identifiers at substantially the same time from a plurality of first devices that each have the same location identifier, the code is further executable by the processor to send a code of a plurality of different codes to each of the plurality of first devices for presentation on the plurality of first devices, present the plurality of different codes on each of a plurality of second devices in response to the plurality of second devices attempting to authenticate to the application, receive a selection of one of the plurality of different codes from a second device of the plurality of devices, and provide access to the application in response to the selected code matching one of the plurality of different codes presented on the plurality of first devices and in response to the selected code not being previously selected at a different second device of the plurality of second devices.

In one embodiment, the code is further executable by the processor to send a notification to the second device to notify the user of one or more pending authentications from the same location identifier. In certain embodiments, in response to the location identifier for the first device not matching the location identifier for the second device, the code is further executable by the processor to check a history of previously used location identifiers for the second device and provide access to the application in response to identifying a previously used location identifier that matches the location identifier for the first device.

In some embodiments, the history of previously used location identifiers comprises location identifiers for the second device that are one or more of most recently used and most frequently used. In some embodiments, a location identifier from the history of previously used location identifiers from the second device is considered for matching the location identifier of the first device in response to the location identifier satisfying one or more of a recency threshold and a frequency threshold.

In one embodiment, the code is further executable by the processor to verify that the second device is designated as an authorized device for accessing the application prior to providing access to the application on the first device. In various embodiments, the code is further executable by the processor to register the second device as an authorized device in response to the second device being successfully used for authorized access to the application on the first device.

In certain embodiments, verification of the second device comprises verifying that an identifier for the second device matches a previously registered device identifier, the device identifier selected from the group consisting of a media access control ("MAC") address, a device name, a hardware serial number, and a manufacturer-assigned unique device identification number. In one embodiment, the first device comprises an internet-of-things enabled device and the second device comprises a mobile device.

A method for authenticating use of an application includes, in one embodiment, receiving, by a processor, a location identifier for a first device that provides an application that requires authentication for use. The method, in some embodiments, includes receiving a location identifier for a second device that is used to authenticate a user who intends to use the application that the first device provides. The method, in various embodiments, includes providing access to the application that the first device provides in response to the location identifier for the first device matching the location identifier for the second device.

In one embodiment, the location identifier for the first device and the location identifier for the second device comprise public IP addresses. In some embodiments, the location identifier for the first device is received from the first device in response to the application failing to authorize the user to use the application and the second location identifier for the second device is received from the second device in response to the user visiting an online gateway associated with the application.

In one embodiment, the method includes, in response to receiving a plurality of location identifiers at substantially the same time from a plurality of first devices that each have the same location identifier, sending a code of a plurality of different codes to each of the plurality of first devices for presentation on the plurality of first devices, presenting the plurality of different codes on each of a plurality of second devices in response to the plurality of second devices attempting to authenticate to the application, receiving a selection of one of the plurality of different codes from a second device of the plurality of devices, and providing access to the application in response to the selected code matching one of the plurality of different codes presented on the plurality of first devices and in response to the selected code not being previously selected at a different second device of the plurality of second devices.

In one embodiment, the method includes, in response to the location identifier for the first device not matching the location identifier for the second device, checking a history of previously used location identifiers for the second device and providing access to the application in response to identifying a previously used location identifier that matches the location identifier for the first device. In certain embodiments, the method includes verifying that the second device is designated as an authorized device for accessing the application prior to providing access to the application on the first device.

A program product for authenticating use of an application, in one embodiment, includes a computer readable storage medium that stores code executable by a processor. In some embodiments, the executable code includes code to perform receiving a location identifier for a first device that provides an application that requires authentication for use. The executable code, in certain embodiments, includes code to perform receiving a location identifier for a second device that is used to authenticate a user who intends to use the application that the first device provides. The executable code, in certain embodiments, includes code to perform providing access to the application that the first device provides in response to the location identifier for the first device matching the location identifier for the second device.

FIG. 1 is a schematic block diagram illustrating one embodiment of a system 100 for authenticating use of an application. In one embodiment, the system 100 includes one or more information handling devices 102, one or more authentication apparatuses 104, one or more data networks 106, and one or more servers 108. In certain embodiments, even though a specific number of information handling devices 102, authentication apparatuses 104, data networks 106, and servers 108 are depicted in FIG. 1, one of skill in the art will recognize, in light of this disclosure, that any number of information handling devices 102, authentication apparatuses 104, data networks 106, and servers 108 may be included in the system 100.

In one embodiment, the system 100 includes one or more information handling devices 102. The information handling devices 102 may include one or more of a desktop computer, a laptop computer, a tablet computer, a smart phone, a smart speaker (e.g., Amazon Echo®, Google Home®, Apple HomePod®), an Internet of Things device, a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102 and/or to one or more servers 108 over a data network 106, described below. The information handling devices 102, in a further embodiment, may include processors, processor cores, and/or the like that are configured to execute various programs, program code, applications, instructions, functions, and/or the like. The information handling devices 102 may include various sensors for sensing, collecting, monitoring, or the like environmental data. The sensors may include location sensors (e.g., global positioning system ("GPS") sensors), proximity sensors, wireless signal sensors (e.g., sensors configured to sense wireless signals emitted from other devices such as Bluetooth® signals, Wi-Fi signals, near field communication ("NFC") signals, and/or the like), accelerometers, gyroscopes, light sensors, sound sensors, biometric sensors (e.g., blood pressure sensors, heart-rate monitors, fingerprint sensors, oxygen sensors, and/or the like), and/or the like.

In one embodiment, the authentication apparatus 104 is configured to provide easy and quick authentication of a user who is trying to use an application that executes on an Internet of Things device without requiring much if any input from the user. In one embodiment, the authentication apparatus 104 is configured to receive a location identifier for a first device that provides an application that requires authentication for use. In further embodiments, the authentication apparatus 104 is configured to receive a location identifier for a second device that is used to authenticate a user who intends to use the application that the first device provides. In certain embodiments, the authentication apparatus 104 is configured to provide access to the application that the first device provides in response to the location identifier for the first device matching the location identifier for the second device. The authentication apparatus 104, including its various sub-modules, may be located on one or more information handling devices 102 in the system 100, one or more servers 108, one or more network devices, and/or the like. The authentication apparatus 104 is described in more detail below with reference to FIGS. 2 and 3.

In one embodiment, the authentication apparatus 104 improves upon conventional application authentication systems by not requiring the user to manually enter codes, words, phrases, and/or other terms into web page or another gateway/portal to authenticate the user. For example, a smart television may include an application that requires that the user authenticate the user's account to use the full functionality of the application, e.g., a music streaming application such as Spotify®. In conventional systems, when the user selects the Spotify® application, the application presents a code that the user is required to enter into a field on the Spotify® website after the user has logged into the user's Spotify® account via a web browser on a different device such as the user's smart phone. When the code is entered correctly, the user is authenticated and is able to use the Spotify® application on the smart television.

However, there are shortcomings to the above process. For instance, if the user incorrectly enters the code or does not enter the code in a predetermined period of time, then the user will need to start over or request a new code. Similarly, the user may not have immediate access to a web browser or may have a device that does not have a screen or a connected input device. The solution described herein cures the deficiencies in the conventional methods by checking whether a location identifier, such as an internet protocol ("IP") address of the Internet of Things device and a location identifier (e.g., an IP address) of a different device match during the authentication process for the application that the user wants to use on the Internet of Things device. If the location identifiers match, then the authentication apparatus 104 determines that the devices are on the same network, and the matching location identifiers serve as the authentication code without requiring the user to manually enter any codes, words, phrases, or other strings. Thus, in such an embodiment, the authentication apparatus 104 may be located on a server 108 associated with a service provider, e.g., Netflix®, Spotify®, Hulu®, etc., on an Internet of Things enabled device, on a smart phone or other mobile device associated with a user, and/or any combination of the foregoing.

In various embodiments, the authentication apparatus 104 may be embodied as a hardware appliance that can be installed or deployed on an information handling device 102, on a server 108, or elsewhere on the data network 106. In certain embodiments, the authentication apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the authentication apparatus 104 may include a power interface, a wired and/or wireless network interface, a graphical interface that attaches to a display, and/or a semiconductor integrated circuit device as described below, configured to perform the functions described herein with regard to the authentication apparatus 104.

The authentication apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the authentication apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the authentication apparatus 104.

The semiconductor integrated circuit device or other hardware appliance of the authentication apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the authentication apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102. The servers 108 may comprise back-end servers for various multimedia streaming services, news services, gaming services, and/or the like that are accessible via a mobile application, an application for an Internet of Things device, and/or the like.

Figure 2:
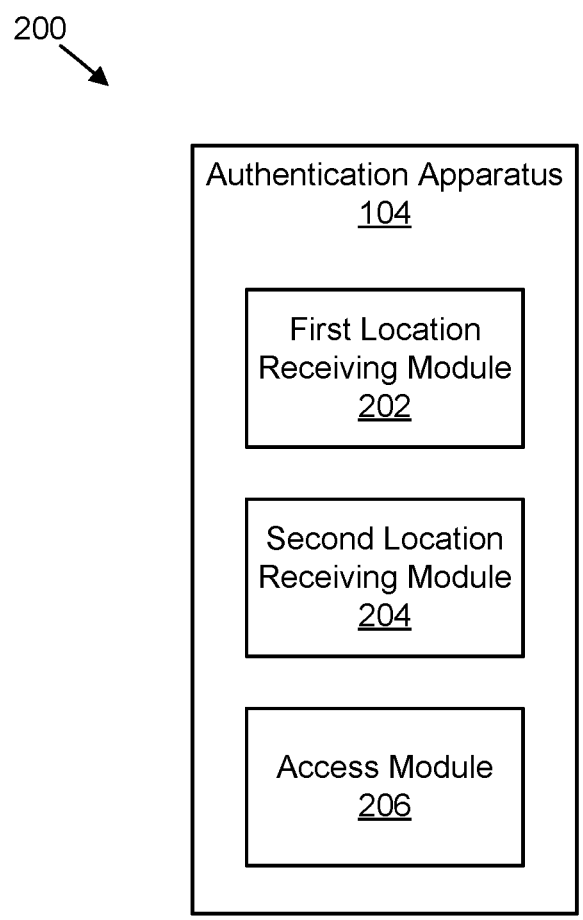
FIG. 2 is a schematic block diagram illustrating one embodiment of an apparatus for authenticating use of an application.

FIG. 2 is a schematic block diagram illustrating one embodiment of an apparatus 200 for authenticating use of an application. In one embodiment, the apparatus 200 includes an embodiment of an authentication apparatus 104. The authentication apparatus 104, in some embodiments, includes one or more of a first location receiving module 202, a second location receiving module 204, and an access module 206, which are described in more detail below.

In one embodiment, the first location receiving module 202 is configured to receive a location identifier for a first device. In certain embodiments, the first device is an Internet of Things ("IoT") device that provides an application that requires authentication for use. As used herein, an IoT device may comprise a consumer product or device that includes Internet connectivity such as televisions, set-top boxes (e.g., streaming boxes such as Roku®, Apple TV®, or the like) kitchen appliances, garage door openers, sprinkler systems, electrical outlets, light fixtures, and/or the like. Furthermore, as used herein, a location identifier may comprise an identifier, a token, or the like that indicates a digital, virtual, and/or physical location for a device. Examples may include an IP address, a global positioning system ("GPS") location, an address, and/or the like.

In one embodiment, the IoT devices include applications that are installed on the IoT devices and can be executed on the IoT devices. For instance, a smart television or a set-top streaming box may include various applications for streaming content such as music, television, movies, images, games, and/or the like. For example, there may be an ESPN® application, a Netflix® application, an Amazon® application, a CNN® application, a Hulu® application, and/or the like. When a user selects an application, the application may require that the user authenticate his/her user account so that the user has access to the application's functionality. For instance, the Hulu® application may require the user to verify their user account to be able to stream live television, watch television shows on demand, watch movies, and/or other features that Hulu® provides as a service provider.

In certain embodiments, in response to the user selecting an application to execute on the IoT device and/or in response to the application requiring the user to authenticate the user's account to use the application, the first location receiving module 202 receives a location identifier for the IoT device. In embodiments where the location identifier is an IP address, the IP address may be a public IP address, a front-facing IP address for a private network, and/or the like that a router for a home, business, school, or the like receives from an internet service provider ("ISP"). The IP address may be dynamic (e.g., an IP address that may change periodically) or static (e.g., an IP address that doesn't change).

In one embodiment, the first location receiving module 202 may send a request for the location identifier for the first device in response to the application being selected. In further embodiments where the location identifier is an IP address, the first location receiving module 202 receives the public IP address for the first device from a packet, such as a handshaking packet, an acknowledgement packet, and/or other type of data packet that is received from the first device when the application is selected.

In one embodiment, the location identifier for the first device is sent to the first location receiving module 202 in response to failing to authenticate the user or verify the user's account to use the application when the user selects the application on the first device. For instance, if the user selects an ESPN® application on an Apple TV®, but the ESPN® application, the backend ESPN® authentication server, or the like determines that the user needs to log in to the user's account to access the application in response to a verification request, the first location receiving module 202 may receive the public IP address for the Apple TV® as part of the verification request or in a subsequent data packet that the ESPN® application sends to the ESPN® backend servers 108.

The second location receiving module 204, in one embodiment, is configured to receive a location identifier for a second device that is used to authenticate a user, user account, or the like for the application that was selected on the first device. In other words, the second location receiving module 204 receives a location identifier from a device of a user who intends to use the application that the first device provides. For instance, after the user selects an application on the first device, e.g., the IoT enabled device, the user may then be directed to visit a website, portal, gateway, mobile application, web service, or the like associated with the application (e.g., to log into the user's account), which simultaneously sends, transmits, or otherwise provides the IP address for the second device to the second location receiving module 204, e.g., in a data packet sent to the backend server 108 associated with the service provider for the application.

For example, after the user selects the Hulu® application on smart television, the Hulu® application may direct the user to visit "hulu.com" on their mobile device to verify the user's Hulu® account. When the user visits "hulu.com" using a web browser on the user's mobile device, the public IP address for the mobile device may be sent as part of the request to the web server hosting "hulu.com", where it may be received by the second location receiving module 204. Furthermore, the user may be required to sign into their Hulu® account using their electronic credentials (e.g., username and password) or the user may be automatically logged into the user's account from a previous time that the user logged into the account.

In some embodiments, the user may provide voice commands to the second device to trigger, cause, or otherwise initiate authentication using the second device. In such an embodiment, the second device may not be configured with a screen, display, or other input device, e.g., a smart speaker such as a Google Home® or Alexa® device. Thus, the subject matter disclosed herein allows the user to use devices without displays or input devices to be used to authenticate the user's account to use an application on the first device because the location identifiers of the first and second devices are automatically received and compared and the user is not required to manually enter a code or the like.

The access module 206, in one embodiment, is configured to provide access to the application that the first device provides in response to the location identifier for the first device matching the location identifier for the second device. For instance, the access module 206 compares the public IP address for the first device, e.g., the IoT device, that the first location receiving module 202 receives and the public IP address for the second device, e.g., the user's mobile device, that the second location receiving module 204 receives to determine if the IP address are the same. If so, then after the user successfully logs into the user account at the service provider of the application, the access module 206 determines that the devices are on the same network, which indicates that the user of the second device is attempting to use the application on the first device and provides access to the application on the first device (e.g., provides access to the full functionality, content, offerings, or the like of the application).

Figure 3:
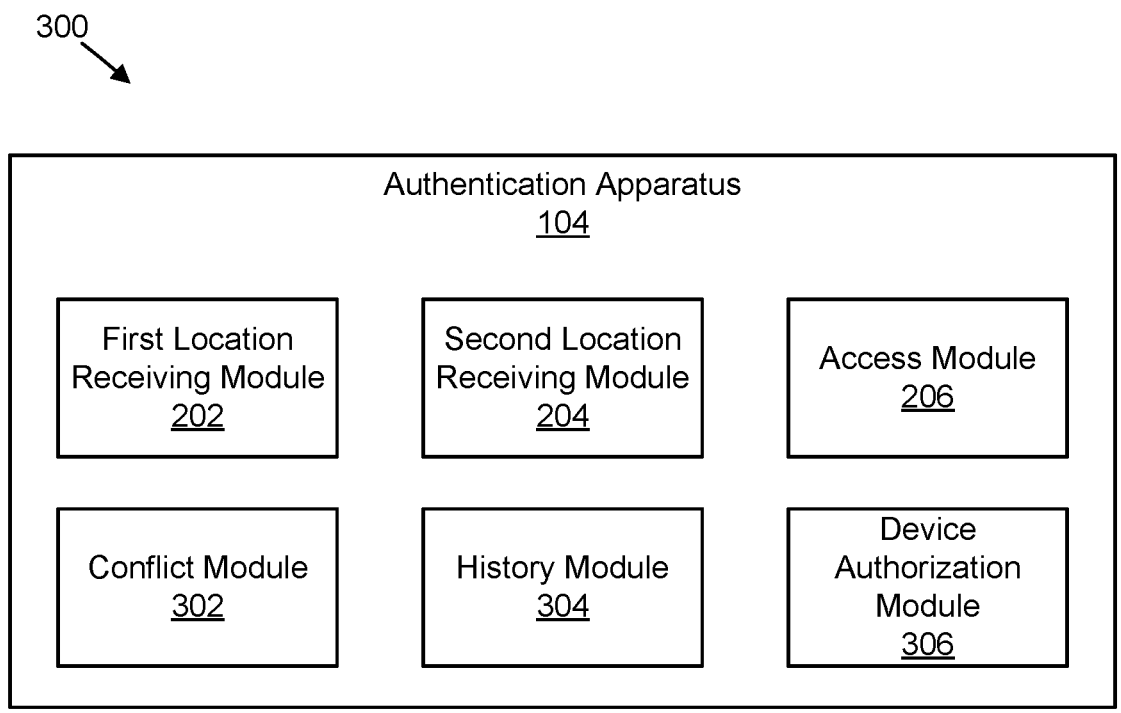
FIG. 3 is a schematic block diagram illustrating one embodiment of another apparatus for authenticating use of an application.

FIG. 3 is a schematic block diagram illustrating one embodiment of an apparatus 300 for authenticating use of an application. In one embodiment, the apparatus 300 includes an embodiment of an authentication apparatus 104. The authentication apparatus 104, in some embodiments, includes one or more of a first location receiving module 202, a second location receiving module 204, and an access module 206, which may be substantially similar to the first location receiving module 202, the second location receiving module 204, and the access module 206 described above with reference to FIG. 2. In further embodiments, the authentication apparatus 104 includes one or more of a conflict module 302, a history module 304, and a device authorization module 306, which are described in more detail below.

In one embodiment, the conflict module 302 is configured to resolve conflicts where multiple second devices from the same location identifier are attempting to authenticate user accounts for applications from multiple first devices from the same location identifier. For example, in a hotel scenario multiple different people may attempt to authenticate their Netflix® accounts to use a Netflix® application provided on a smart television in their hotel rooms. Accordingly, if multiple different people attempt to access the Netflix® application at substantially the same time, the first location receiving module 202 may receive a plurality of IP addresses at the same time from a plurality of different smart televisions and the second location receiving module 204 may receive a plurality of IP addresses at the same time from a plurality of different users' mobile devices. Without any additional indication of which mobile devices are associated with particular smart televisions, the access module 206 may not be able to determine which user accounts to authenticate to a particular application based solely on the IP addresses.

In such an embodiment, the conflict module 302 generates a plurality of different, unique codes and sends a code of a plurality of different codes to each of the plurality of first devices for presentation on the plurality of first devices. The conflict module 302 may also send the plurality of codes to each of the second devices that are attempting to authenticate the user's account to use the application on the first device. The conflict module 302, located on the second devices, may present the plurality of codes on the second devices for the user to view and select the code that matches the code presented on the first device. The conflict module 302, located on a backend server 108, may receive the code that the user selects on the second device and compare the selected code to a code that is presented on the first device. If the codes match, then the user is authenticated and provided access to the application. In certain embodiments, the conflict module 302 determines whether a selected code is still valid, has already been selected (e.g., selected erroneously by a different user), or the like. If so, the conflict module 302 may prevent the user from being authenticated to use the application and may restart or prompt to restart the authentication process.

In one embodiment, the conflict module 302 receives additional information or location identifiers from the first and second devices to verify the user's account. For instance, in a hotel scenario, the first and second devices may send information regarding the hotel room where the user is staying. For example, the first device may send information to the conflict module 302 about the hotel room that the where the second device is located or has been assigned/configured, and the second device may send room information associated with the room where the user is staying based on room assignment information from the hotel information system, the user's email/text messages, and/or the like. The conflict module 302 may also prompt the user for his/her room information when the user visits the gateway/portal for the service provider of the application on the first device using the second device. If the room number information matches, then the user's account is verified for using the application on the first device.

Other supplemental information may also include location data such as GPS data, cellular or Wi-Fi triangulation information, or other location services data. For instance, the first device and the second device may have location sensors that determine and provide the locations of the first device and the second device. The location information for the first device may be sent to the conflict module 304 when the user selects an application on the first device and the location information for the second device may be sent to the conflict module 304 when the user logs into or access his/her account. If the location information is a match or substantially the same (e.g., within a threshold distance of one another) then the user's account can be verified for using the application on the first device.

In further embodiments, proximity information may be used to determine whether a first and a second devices are associated with each other. For instance, a first device may include a proximity sensor, a motion sensor, a wireless signal sensor, and/or the like that detects and identifies devices or users that are within a proximity of the first device. Similarly, the second device, e.g., the user's device, may include proximity sensors, motion sensors, wireless signal sensors, and/or the like that can detect and identify the first device (e.g., detect and receive identifying information for the first device). The first and second devices may send identifying information to the conflict module 302 that identifies the device itself and also other devices that it detects within a proximity of itself. If the conflict module 302 determines that identification information from the first device of other devices that the first device detects matches identification information for the second device, and vice versa, then the user's account can be verified for using the application on the first device.

The conflict module 302 may also examine subnet information from received IP addresses to determine whether the first and second devices are on the same subnet. If so, and the first and second devices are the only devices on the same subnet, then the conflict module 302 can match the first and second devices and verify the user's account for using the application on the first device. In such an embodiment, the first and second devices may send private or internal IP address information to the conflict module 302 so that the private or internal IP address information can be examined for subnet information. For example, each room, floor, wing, section, or the like of a hotel may be on the same subnet, which would be an indication that the second device is the device being used to authenticate use of the application on the first device.

In further embodiments, the conflict module 302 is further configured to send a notification to the second device to notify the user that there are multiple pending authentications from the same location identifier. For instance, the conflict module 302 may send and present the notification on the second device and may provide the user with one or more options such as presenting the list of codes so that the user can select the code that matches the code presented on the first device, waiting a period of time (e.g., ten seconds, thirty seconds, or the like) to see if the conflict has resolved itself (e.g., to see if a different user has authenticated so that the user can now authenticate without the conflicting authentications), or the like. The conflict module 302 may also automatically retry authentication periodically based on the location identifiers of the first and second devices, e.g., every ten seconds, every thirty seconds, or the like to see if any conflicting authentications have resolved themselves so that the user is not required to provide any input to authenticate.

In one embodiment, the history module 304 is configured to check a history of previously used location identifiers for the second device in response to the access module 206 determining that the location identifiers for the first and second devices do not match. For example, the history may include a history of IP addresses for networks that the device has been connected to, physical location history (e.g., historical GPS data), and/or the like. If the history module 304 determines that the location identifier for the first device matches a location identifier from the location identifier history for the second device, then the access module 206 may authenticate the user and provide access to the application on the first device. For example, if a smart television is connected to a Wi-Fi network and the user's mobile device is connected to a cellular network, but not the Wi-Fi network, the IP addresses for the smart television and the mobile device will be different, even though the user is trying to use the mobile device to authenticate the user's account for the application on the smart television. Accordingly, the history module 304 checks to see if the user's mobile device has ever been connected to the same network as the smart television based on the IP address history for the mobile device.

In certain embodiments, the history of location identifiers for the second device is organized by the most frequently used location identifiers and/or the most recently used location identifiers. For instance, each time the second device connects to a network, the public IP address for the network or the GPS location for the device is recorded with a timestamp and/or a counter is incremented to keep track of how many times the second device has connected to the network with the public IP address or how many times the device is at or around the GPS location. Accordingly, the history module 304 considers a location identifier from the location identifier history for the second device in response to the location identifier satisfying a frequency threshold and/or a recency threshold. For example, if an IP address from the location identifier history has only been used one time or was used over a year ago, then the history module 304 may not consider it a valid IP address for comparison with the IP address for the first device. The history module 304 may set default thresholds such as that the second device has to use the location identifier at least once a week, at least once within the last month, at least twenty-five times, at least ten times in the last two weeks, and/or the like. If the location identifier frequency or recency information does not satisfy the corresponding thresholds, then the location identifier will not be considered for comparison with the location identifier for the first device.

In one embodiment, the device authorization module 306 verifies that the second device is designated as an authorized device for accessing the application on the first device prior to providing access to the application on the first device. For instance, the device authorization module 306 may register a device as an authorized device that can be used to authenticate the user's account for an application on the first device so that only authentication requests from registered or authorized devices may be allowed. If an authorization request is received from an unregistered second device, the access module 206 may deny authentication for the user until the user registers the second device.

The device authorization module 306, in one embodiment, prompts the user to register the second device the first time the user logs into the user's account to authenticate the user, every time the user logins into the user's account if the user has not previously registered the second device, in response to a device authorization request from the second device, and/or the like. The device authorization module 306 may register an identifier for the second device such as a MAC address or other hardware serial number, a unique identifier or name for the second device, a manufacturer assigned unique device identification number, and/or the like.

Figure 4:
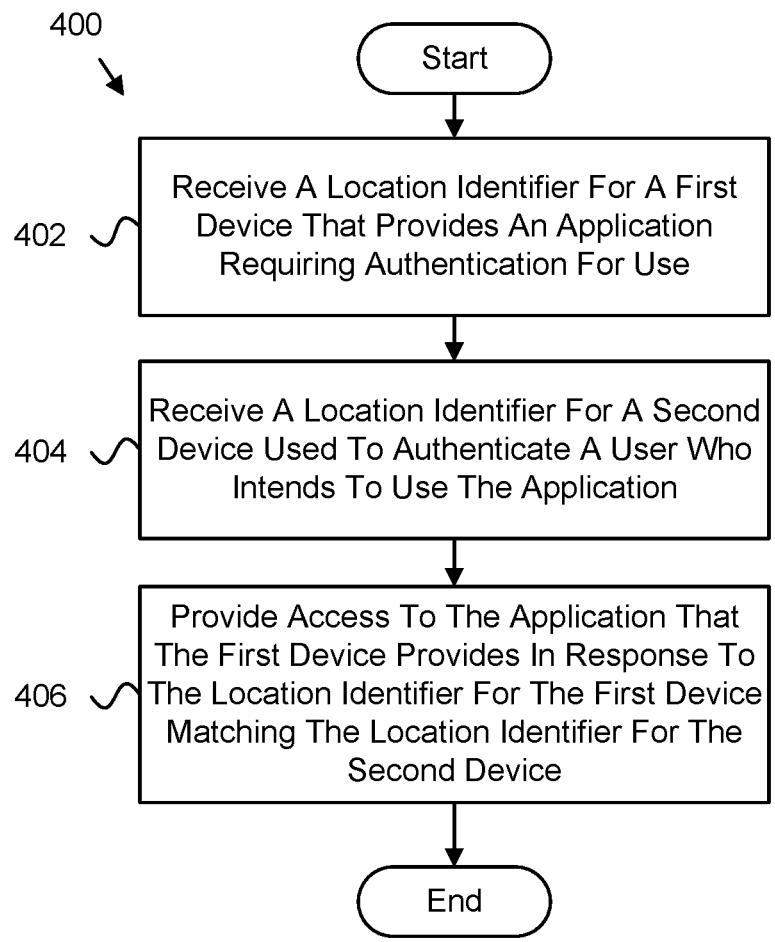
FIG. 4 is a schematic flow chart diagram illustrating one embodiment of a method for authenticating use of an application.

FIG. 4 is a schematic flow chart diagram illustrating one embodiment of a method 400 for authenticating use of an application. In one embodiment, the method 400 begins and receives 402 a location identifier, e.g., an IP address for a first device. The first device provides an application that requires authentication prior to using the application. The method 400, in certain embodiments, receives 404 a location identifier, e.g., an IP address for a second device. The second device is used to authenticate a user who intends to use the application that the first device provides. In some embodiments, the method 400 provides 406 access to the application that the first device provides in response to the location identifier for the first device matching the location identifier for the second device, and the method 400 ends. In various embodiments, the first location receiving module 202, the second location receiving module 204, and the access module 206 perform the various steps of the method 400.

Figure 5:
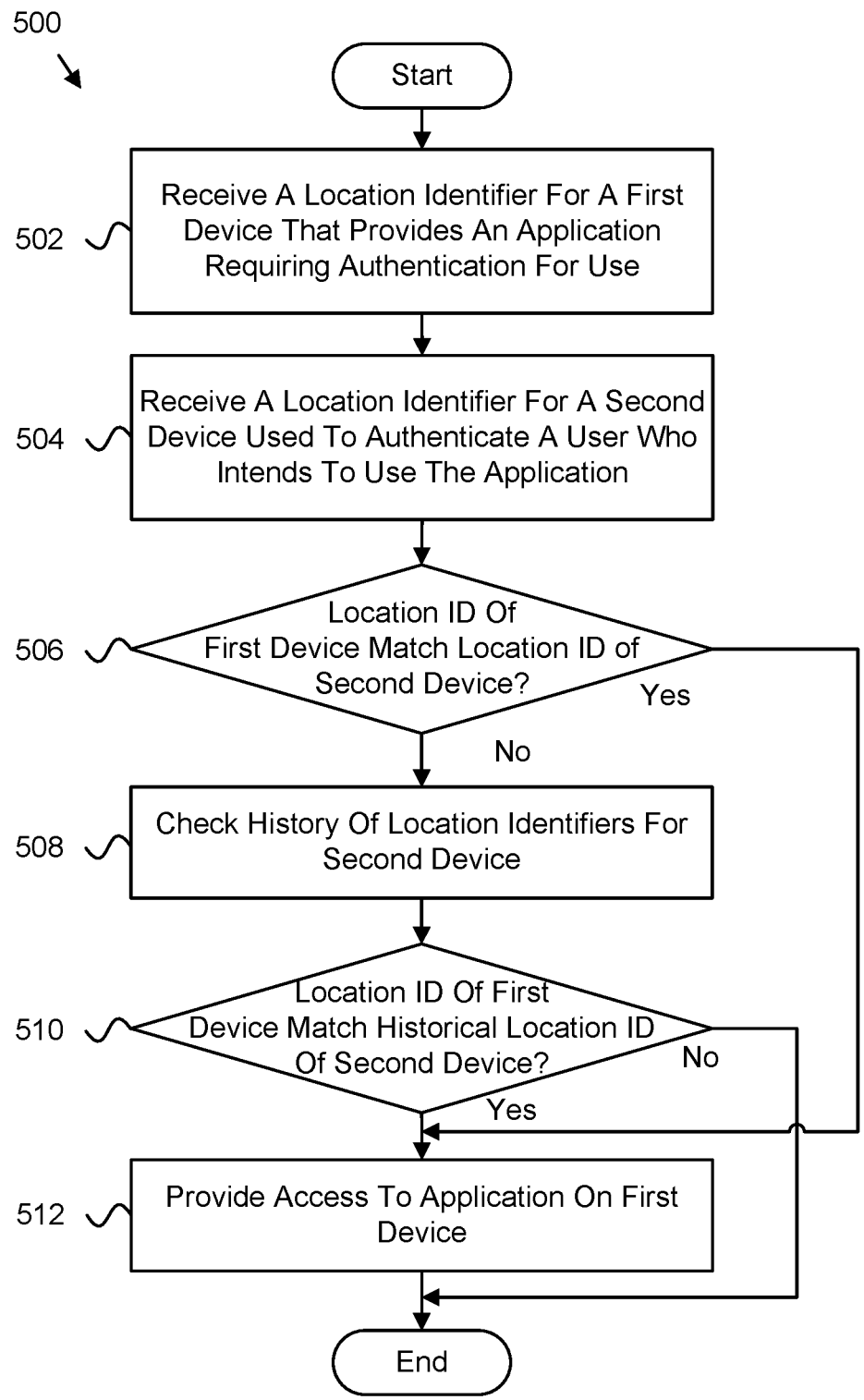
FIG. 5 is a schematic flow chart diagram illustrating one embodiment of another method for authenticating use of an application.

FIG. 5 is a schematic flow chart diagram illustrating one embodiment of another method 500 for authenticating use of an application. In one embodiment, the method 500 begins and receives 502 a location identifier, e.g., an IP address for a first device. The first device provides an application that requires authentication prior to using the application. The method 500, in certain embodiments, receives 504 a location identifier, e.g., an IP address for a second device. The second device is used to authenticate a user who intends to use the application that the first device provides.

In some embodiments, if the method 500 determines 506 that the location identifier of the first device matches the location identifier of the second device, the method 500 provides 512 access to the application on the first device, and the method 500 ends. Otherwise, the method 500 checks 508 a history of location identifiers for the second device. If the method 500 determines 510 that a location identifier of the first device matches a previously-used location identifier in the location identifier history for the second device, the method 500 provides 512 access to the application on the first device, and the method 500 ends. Otherwise, if the method 500 determines 510 that a location identifier of the first device does not match a previously-used location identifier in the location identifier history for the second device, then the method 500 ends. In various embodiments, the first location receiving module 202, the second location receiving module 204, the access module 206, and the history module 304 perform the various steps of the method 500.

Figure 6:
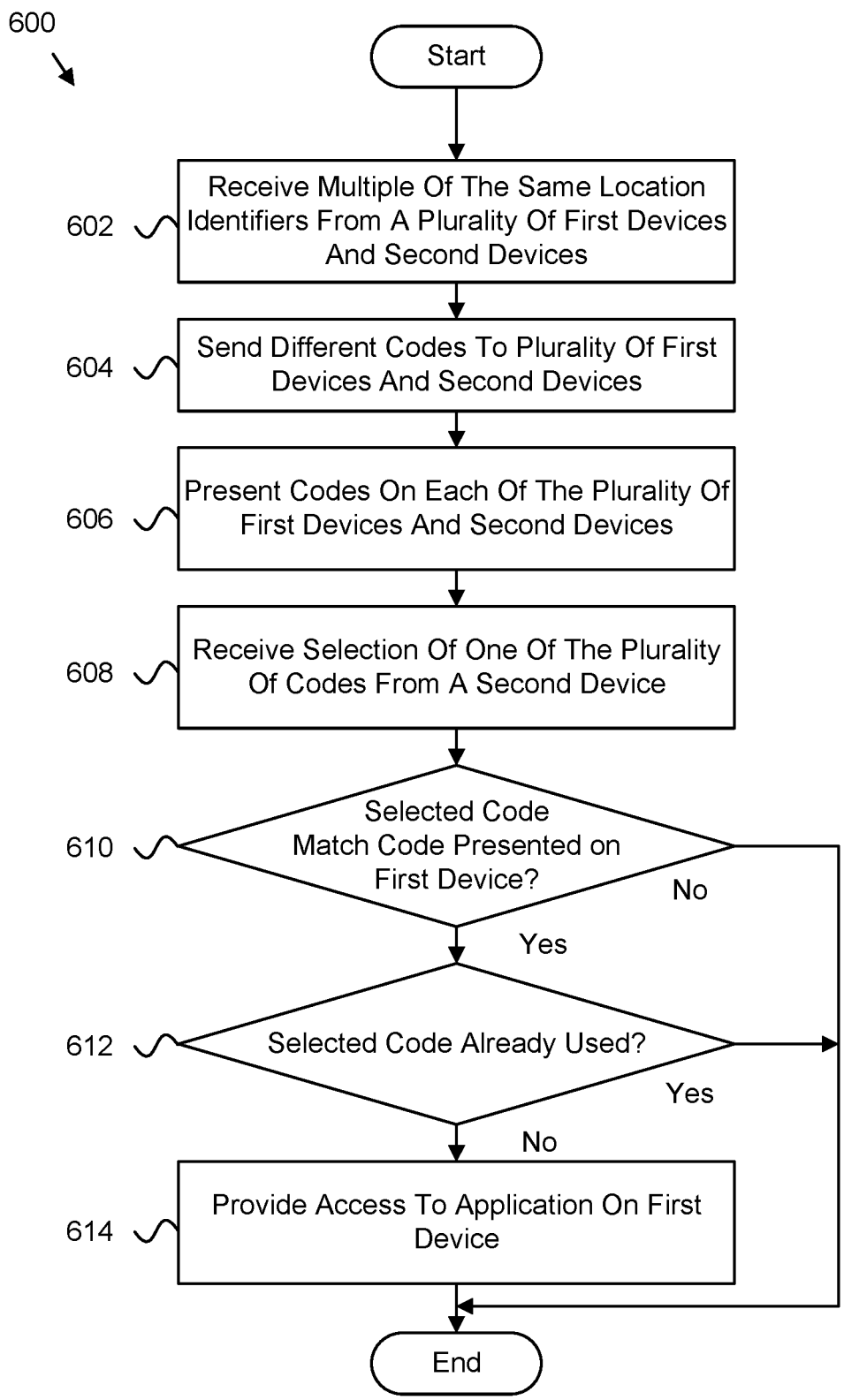
FIG. 6 is a schematic flow chart diagram illustrating one embodiment of yet another method for authenticating use of an application.

FIG. 6 is a schematic flow chart diagram illustrating one embodiment of another method 600 for authenticating use of an application. In one embodiment, the method 600 begins and receives 602 a plurality of the same location identifiers, e.g., IP addresses from multiple different first devices and second devices. In further embodiments, the method 600 sends 604 different codes to each of the first devices and second devices in response to an application being selected on the first devices and in response to the second devices being used to authenticate the user to use the application on the first devices. The method 600, in some embodiments, presents 606 the codes on each of the first and second devices and receives 608 a selection of a code from a second device that matches the code displayed on the corresponding first device.

In further embodiments, in the method 600 determines 610 that the selected code matches the code displayed on a first device, and if the method 600 determines 612 that the selected code has already been used, then the method 600 ends. Otherwise, if the method 600 determines 610 that the selected code matches the code displayed on a first device, and if the method 600 determines 612 that the selected code has not already been used, then the method 600 provides access to the application on the first device. Otherwise, if the method 600 determines 610 that the selected code does not match a code presented on the first device, then the method 600 ends. In various embodiments, the first location receiving module 202, the second location receiving module 204, the access module 206, and the conflict module 302 perform the various steps of the method 600.

Embodiments may be practiced in other specific forms. The described embodiments are to be considered in all respects only as illustrative and not restrictive. The scope of the subject matter disclosed herein is, therefore, indicated by the appended claims rather than by the foregoing description. All changes which come within the meaning and range of equivalency of the claims are to be embraced within their scope.

What is claimed is:

1. An apparatus, comprising: a processor; a memory that stores code executable by the processor to:
    receive a first location identifier for a first device, wherein:
      the first location identifier indicates a first network to which the first device is currently attached and communicating thereon,
      and the first device is configured to provide an application that requires authentication for use;
    receive a second location identifier for a second device, wherein:
      the second location identifier indicates a second network to which the second device is currently attached and communicating thereon,
      and the second device is configured to authenticate a user who intends to use the application provided on the first device;
    compare the first location identifier and the second location identifier to determine a match, wherein
      the match means that
        the first network and the second network are a same local area network, and
        the first device and second device:
          are attached to and communicating on the same local area network, and
          use a common router attached to the same local area network to communicate outside of the same local area network;
      and a non-match of the compare indicates that the first network and the second network are different networks;
    in response to the match and in response to the second device authenticating the user while communicating on the second network to use the application:
      authenticate the application for use on the first device, and
      store the second location identifier, an identifier of the second device, and an association therebetween;
    in response to the authentication, grant the first device access to the application while the first device and the second device are attached to and communicating on the same local area network;
    receive a third location identifier from the first device indicating a third network to which the first device is currently attached an communicating thereon,
    receive a fourth location identifier from the second device indicating a fourth network to which the second device is currently attached an communicating thereon,
    when the third location identifier does not match the fourth location identifier, retrieve the stored second location identifier using the identifier of the second device and compare the third location identifier to the retrieved second location identifier,
    when the comparison of the third location identifier and the retrieved stored second location identifier yields a match and the user is again authenticated to use the application by the second device while communicating on the fourth network, grant the first device access to the application.

2. The apparatus of claim 1, wherein the first location identifier for the first device and the second location identifier for the second device comprise public internet protocol ("IP") addresses.

3. The apparatus of claim 1, wherein:
    the first location identifier for the first device is received from the first device in response to the application failing to authorize the user to use the application; and
    the second location identifier for the second device is received from the second device in response to the user visiting an online gateway associated with the application.

4. The apparatus of claim 3, wherein the online gateway is selected from the group consisting of a web page, a web service, and a mobile application.

5. The apparatus of claim 1, wherein, in response to receiving a plurality of location identifiers at substantially the same time from a plurality of devices that each have the same location identifier, the code is further executable by the processor to:
    send a different code of a plurality of different codes to each of the plurality of devices for presentation on the plurality of devices;
    present the different code on each of a plurality of authentication devices in response to the plurality of authentication devices attempting to authenticate the application;
    receive a selection of a particular different code of the plurality of different codes from an authentication device of the plurality of authentication devices; and
    provide access to the application in response to the selected different code matching the particular different code of the plurality of different codes presented on the plurality of devices and in response to the selected different code not being previously selected at a different authentication device of the plurality of authentication devices.

6. The apparatus of claim 5, wherein the code is further executable by the processor to send a notification to the second device to notify the user of one or more pending authentications from the same location identifier.

7. The apparatus of claim 1, wherein the code is further executable by the processor to verify that the second device is designated as an authorized device for accessing the application prior to providing access to the application on the first device.

8. The apparatus of claim 7, wherein the code is further executable by the processor to register the second device as an authorized device in response to the second device being successfully used for authorized access to the application on the first device.

9. The apparatus of claim 7, wherein verification of the second device comprises verifying that at least one second identifier for the second device matches a previously registered device identifier, the previously registered device identifier selected from the group consisting of a media access control ("MAC") address, a device name, a hardware serial number, and a manufacturer-assigned unique device identification number.

10. The apparatus of claim 1, wherein the first device comprises an internet-of-things enabled device and the second device comprises a mobile device.

11. A method implemented by a processor, comprising:
receiving a first location identifier for a first device, wherein:
the first location identifier indicates a first network to which the first device is currently attached and communicating thereon,
and the first device is configured to provide an application that requires authentication for use;
receiving a second location identifier for a second device, wherein:
the second location identifier indicates a second network to which the second device is currently attached and communicating thereon,
and the second device is configured to authenticate a user who intends to use the application provided on the first device;
comparing the first location identifier and the second location identifier to determine a match, wherein
the match means that
the first network and the second network are a same local area network, and
the first device and second device:
are attached to and communicating on the same local area network, and
use a common router attached to the same local area network to communicate outside of the same local area network;
and a non-match of the compare indicates that the first network and the second network are different networks;
in response to the match and in response to the second device authenticating the user while communicating on the second network to use the application:
authenticating the application for use on the first device, and
storing the second location identifier, an identifier of the second device, and an association therebetween;
in response to the authentication, granting the first device access to the while the first device and the second device are attached to and communicating on the same local area network;
receiving a third location identifier from the first device indicating a third network to which the first device is currently attached an communicating thereon,
receiving a fourth location identifier from the second device indicating a fourth network to which the second device is currently attached an communicating thereon,
when the third location identifier does not match the fourth location identifier, retrieving the stored second location identifier using the identifier of the second device and comparing the third location identifier to the retrieved second location identifier,
when the comparison of the third location identifier and the retrieved stored second location identifier yields a match and the user is again authenticated to use the application by the second device while communicating on the fourth network, granting the first device access to the application.

12. The method of claim 11, wherein the first location identifier for the first device and the second location identifier for the second device comprise public internet protocol ("IP") addresses.

13. The method of claim 11, wherein:
the first location identifier for the first device is received from the first device in response to the application failing to authorize the user to use the application; and
the second location identifier for the second device is received from the second device in response to the user visiting an online gateway associated with the application.

14. The method of claim 11, further comprising, in response to receiving a plurality of location identifiers at substantially the same time from a plurality of devices that each have the same location identifier:
sending a different code of a plurality of different codes to each of the plurality of devices for presentation on the plurality of devices;
presenting the different code on each of a plurality of authentication devices in response to the plurality of authentication devices attempting to authenticate the application;
receiving a selection of a particular different code of the plurality of different codes from an authentication device of the plurality of authentication devices; and
providing access to the application in response to the selected different code matching the particular different code of the plurality of different codes presented on the plurality of devices and in response to the selected different code not being previously selected at a different authentication device of the plurality of authentication devices.

15. The method of claim 11, further comprising verifying that the second device is designated as an authorized device for accessing the application prior to providing access to the application on the first device.

16. A program product comprising a non-transitory computer-readable storage medium that stores code that when executed by a processor causes the processor to preform steps comprising:
receiving a first location identifier for a first device, wherein:
the first location identifier indicates a first network to which the first device is currently attached and communicating thereon,
and the first device is configured to provide an application that requires authentication for use;
receiving a second location identifier for a second device, wherein:
the second location identifier indicates a second network to which the second device is currently attached and communicating thereon,
and the second device is configured to authenticate a user who intends to use the application provided on the first device;
comparing the first location identifier and the second location identifier to determine a match, wherein
the match means that
the first network and the second network are a same local area network, and
the first device and second device:
are attached to and communicating on the same local area network, and
use a common router attached to the same local area network to communicate outside of the same local area network;

and a non-match of the compare indicates that the first network and the second network are different networks;
in response to the match and in response to the second device authenticating the user while communicating on the second network to use the application:
   authenticating the application for use on the first device, and
   storing the second location identifier, an identifier of the second device, and an association therebetween;
in response to the authentication, granting the first device access to the while the first device and the second device are attached to and communicating on the same local area network;
receiving a third location identifier from the first device indicating a third network to which the first device is currently attached an communicating thereon,
receiving a fourth location identifier from the second device indicating a fourth network to which the second device is currently attached an communicating thereon,
when the third location identifier does not match the fourth location identifier, retrieving the stored second location identifier using the identifier of the second device and comparing the third location identifier to the retrieved second location identifier,
when the comparison of the third location identifier and the retrieved stored second location identifier yields a match and the user is again authenticated to use the application by the second device while communicating on the fourth network, granting the first device access to the application.

* * * * *